(12) United States Patent
Shinohara et al.

(10) Patent No.: US 10,603,865 B2
(45) Date of Patent: Mar. 31, 2020

(54) INSULATING MEMBER AND ITS ATTACHING METHOD

(71) Applicant: AGC Inc., Chiyoda-ku (JP)

(72) Inventors: Nobuhiro Shinohara, Chiyoda-ku (JP);
Yuya Hamada, Chiyoda-ku (JP);
Hironori Sato, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 650 days.

(21) Appl. No.: 14/964,725

(22) Filed: Dec. 10, 2015

(65) Prior Publication Data
US 2016/0185068 A1    Jun. 30, 2016

(30) Foreign Application Priority Data

Dec. 25, 2014  (JP) ................................. 2014-262121
Dec. 4, 2015   (JP) ................................. 2015-238058

(51) Int. Cl.
*B32B 3/08* (2006.01)
*F16L 59/065* (2006.01)
(Continued)

(52) U.S. Cl.
CPC .................. *B32B 3/08* (2013.01); *B32B 3/04* (2013.01); *B32B 5/18* (2013.01); *B32B 27/065* (2013.01);
(Continued)

(58) Field of Classification Search
None
See application file for complete search history.

(56) References Cited

U.S. PATENT DOCUMENTS

| | | | | |
|---|---|---|---|---|
| 5,082,335 A | * | 1/1992 | Cur .......................... | E04B 1/803 312/401 |
| 2006/0048414 A1 | * | 3/2006 | Takada ................. | A43B 13/189 36/93 |

(Continued)

FOREIGN PATENT DOCUMENTS

| | | | |
|---|---|---|---|
| DE | 4339435 A1 | * | 5/1995 |
| DE | 202014008767 U1 | * | 2/2015 |

(Continued)

OTHER PUBLICATIONS

Machine Translation of Japanese Patent 2009-236183, Date Unknown.*

(Continued)

*Primary Examiner* — Jeffry H Aftergut
(74) *Attorney, Agent, or Firm* — Oblon, McClelland, Maier & Neustadt, L.L.P.

(57) ABSTRACT

To provide an insulating member with which a high insulating effect is stably obtained, and a method for attaching it. An insulating member 2 comprising a vacuum insulation panel 10 in a board-like shape and an elastic body 12A, wherein the vacuum insulation panel 10 has a core material and a gas barrier film covering the core material, the core material is decompressed and encapsulated in an outer sheath formed of the gas barrier film, the elastic body 12A has a degree of elongation of at least 10%, an Asker F hardness of at least 10 and an Asker C hardness of at most 30, and the elastic body 12A is provided on the entire surface of an application surface 10a of the vacuum insulation panel 10.

11 Claims, 10 Drawing Sheets

(51) Int. Cl.
*B32B 27/06* (2006.01)
*B32B 3/04* (2006.01)
*F16L 59/02* (2006.01)
*B32B 5/18* (2006.01)
*B32B 37/14* (2006.01)

(52) U.S. Cl.
CPC .......... *B32B 37/142* (2013.01); *F16L 59/026* (2013.01); *F16L 59/065* (2013.01); *B32B 2260/021* (2013.01); *B32B 2260/025* (2013.01); *B32B 2260/04* (2013.01); *B32B 2264/102* (2013.01); *B32B 2266/025* (2013.01); *B32B 2266/0207* (2013.01); *B32B 2266/0214* (2013.01); *B32B 2266/0278* (2013.01); *B32B 2266/0285* (2013.01); *B32B 2307/102* (2013.01); *B32B 2307/304* (2013.01); *B32B 2307/50* (2013.01); *B32B 2307/536* (2013.01); *B32B 2307/726* (2013.01); *B32B 2307/7242* (2013.01); *B32B 2419/00* (2013.01); *B32B 2439/00* (2013.01); *B32B 2509/00* (2013.01); *B32B 2509/10* (2013.01); *B32B 2605/00* (2013.01)

(56) References Cited

U.S. PATENT DOCUMENTS

2009/0179541 A1* 7/2009 Smith ................. B29C 63/02
                                                      312/406
2012/0114895 A1* 5/2012 Vo ................. B29C 44/5627
                                                       428/69
2015/0260331 A1* 9/2015 Shinohara ............. B32B 9/046
                                                      428/35.4
2015/0315779 A1* 11/2015 Baily ................. E04B 1/803
                                                       428/69

FOREIGN PATENT DOCUMENTS

| EP | 1544367 A2 * | 6/2005 |
| EP | 2 930 413 A1 | 10/2015 |
| JP | 10-205993 A * | 8/1998 |
| JP | 2004-239300 | 8/2004 |
| JP | 2005-161794 A * | 6/2005 |
| JP | 2009-236183 A * | 10/2009 |
| JP | 4419400 | 2/2010 |
| KR | 101243695 A * | 3/2013 |
| WO | WO-2014/089448 A1 * | 6/2014 |

OTHER PUBLICATIONS

Machine Translation of German Patent 202014008767, Date Unknown.*
Machine Translation of Korean Patent 10-134695, Date Unknown.*
Machine Translation of European Patent 1544367, Date Unknown.*
Machine Translation of Japanese Patent 10-205993, Date Unknown.*
Machine Translation of Japanese Patent 2005-161794, Date Unknown.*

* cited by examiner

INSULATING MEMBER AND ITS ATTACHING METHOD

The present invention relates to an insulating member and a method for attaching it.

Vacuum insulation panels have been used so as to reduce energy consumption by thermal insulation, in a house, a building, a vehicle, an insulating container, a refrigerator, a water heater, etc. Vacuum insulation panels may, for example, be a vacuum insulation panel which is produced by decompressing and encapsulating a core material made of powder or fibers in an outer sheath formed of a gas barrier film (for example, JP-A-2004-239300).

A vacuum insulation panel is usually in a plate form, and is bonded to an application surface of an object to be insulated by using a double-coated pressure-sensitive adhesive tape or the like. When the application surface of the object to be insulated is curved, the vacuum insulation panel is bonded as curved along the application surface.

However, by a method of providing the vacuum insulation panel to the application surface of the object to be insulated, no sufficient insulating effect may be obtained in some cases. Particularly, if the surface of the vacuum insulation panel has irregularities such as wrinkles formed by curving the vacuum insulation panel, a sufficient insulating effect is hardly obtained e.g. in a case where the edge of the gas barrier film in the vacuum insulation panel is folded. Further, a sufficient insulating effect is hardly obtained even with a thick double-coated pressure-sensitive adhesive tape.

It is an object of the present invention to provide an insulating member which stably provides a high insulating effect, and a method for attaching it.

The present invention provides the following.

[1] An insulating member comprising a vacuum insulation panel in a board-like shape and an elastic body,
wherein the vacuum insulation panel has a core material and a gas barrier film covering the core material, and the core material is decompressed and encapsulated in an outer sheath formed of the gas barrier film, and
the elastic body has a degree of elongation of at least 10%, an Asker F hardness of at least 10 and an Asker C hardness of at most 30, and the elastic body is provided on at least the periphery of an application surface of the vacuum insulation panel.
[2] The insulating member according to [1], wherein the elastic body has a thickness of at least 1 mm.
[3] The insulating member according to [1] or [2], wherein the elastic body is made of a synthetic resin, a natural rubber or a synthetic rubber.
[4] The insulating member according to any one of [1] to [3], wherein the elastic body is an elastic foam.
[5] The insulating member according to [4], wherein the elastic foam is at least one member selected from the group consisting of a flexible polyurethane foam, a polyethylene foam, a polypropylene foam, a melamine foam, a polyimide foam, a natural rubber foam and a synthetic rubber foam.
[6] The insulating member according to [4] or [5], wherein the elastic foam has at least one of a sound absorbing property and a water absorbing property.
[7] The insulating member according to any one of [4] to [6], wherein the elastic foam has a heat resistant temperature of at least 100° C.
[8] A method for attaching an insulating member, which comprises bonding the insulating member as defined in any one of [1] to [7] to an objected to be insulated.
[9] A method for attaching an insulating member, which comprises assembling the insulating member as defined in any one of [1] to [7] on an objected to be insulated,
wherein the vacuum insulation panel and the elastic body are separately prepared, and the vacuum insulating panel is bonded to the object to be insulated via the elastic body.

The insulating member of the present invention stably provides a high insulating effect.

Further, according to the method for attaching the insulating member of the present invention, a high insulating effect is stably obtained.

Preferred embodiments of the present invention will now be described, by way of example only, and not in any limitative sense, with reference to the accompanying Drawings in which.

Now, the present invention will be described in detail with reference to the preferred embodiments.

[Insulating Member]

The insulating member of the present invention comprises a vacuum insulation panel and an elastic body mentioned hereinafter, provided on at least the periphery of an application surface of the vacuum insulation panel.

The elastic body in the insulating member of the present invention is provided on at least the periphery of an application surface of the vacuum insulation panel, and may be provided only on the periphery of an application surface of the vacuum insulation panel, or may be provided on the entire application surface of the vacuum insulation panel.

Figure 1:
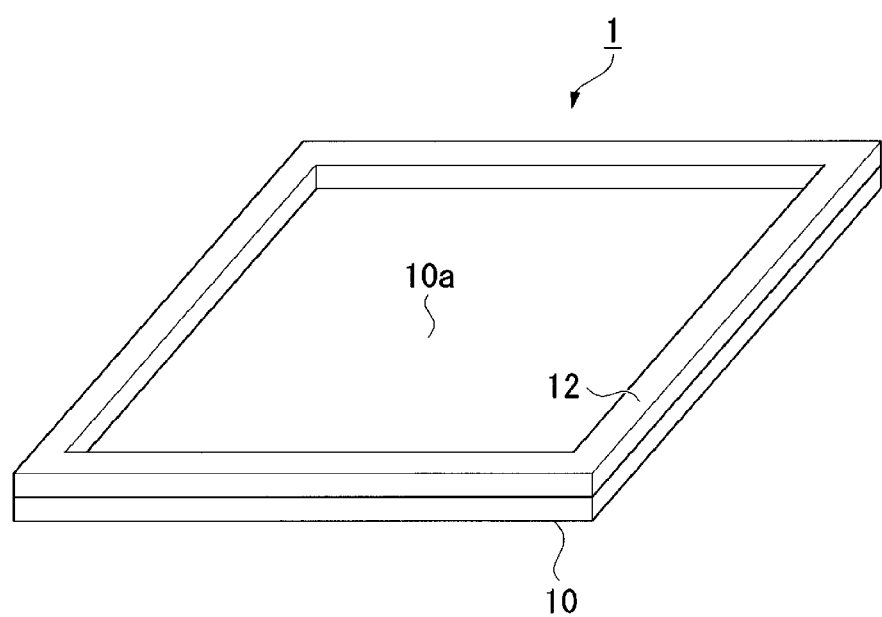
FIG. 1 is a perspective view illustrating an example of the insulating member of the present invention.
Figure 2:
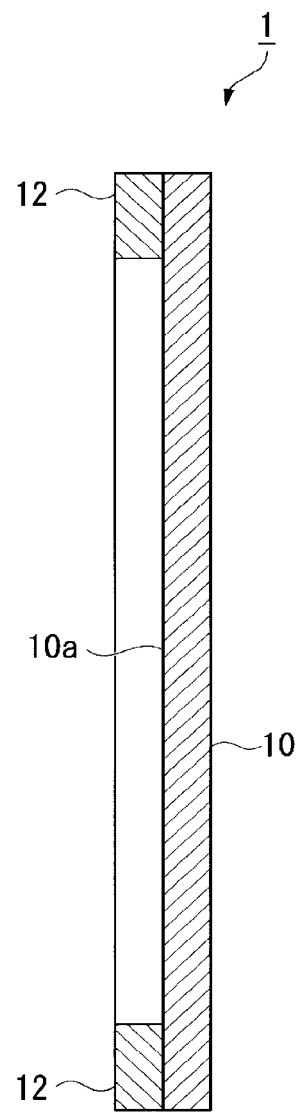
FIG. 2 is a cross-sectional view illustrating the insulating member shown in FIG. 1.
Figure 3:
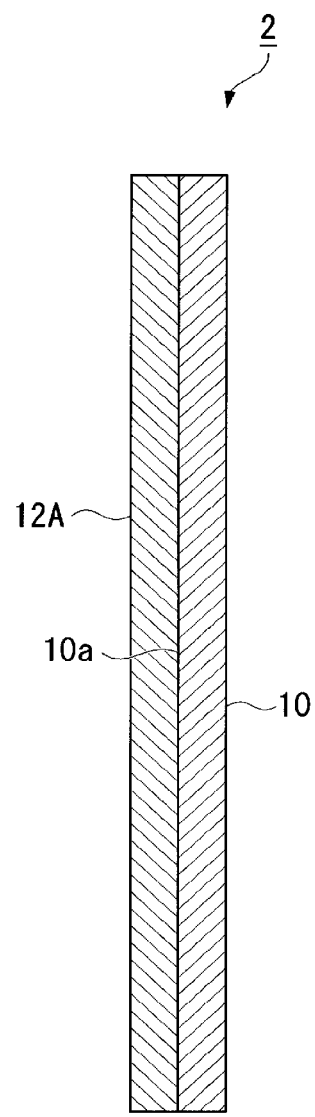
FIG. 3 is a cross-sectional view illustrating another example of the insulating member of the present invention.

Specifically, for example, as shown in FIGS. 1 and 2, an insulating member 1 comprises a flat vacuum insulation panel 10 which is rectangular in a planer view, and an elastic body 12 provided along the entire periphery of an application surface 10a of the vacuum insulation panel 10. As indicated in both FIGS. 1 and 2 the outer edge of the vacuum insulation panel and the outer edge of the elastic body coincide. Otherwise, as shown in FIG. 3, an insulating member 2 comprises a flat vacuum insulation panel 10 which is rectangular in a planner view, and an elastic body 12A provided on the entire application surface 10a of the vacuum insulation panel 10. Further as shown in FIG. 3, the outer edge of the vacuum insulation panel 10 and the outer edge of the elastic body 12A coincide.

Further, the insulating member of the present invention is provided on an application surface of an object to be insulated so that the elastic body is on the side of the object to be insulated.

Figure 4:
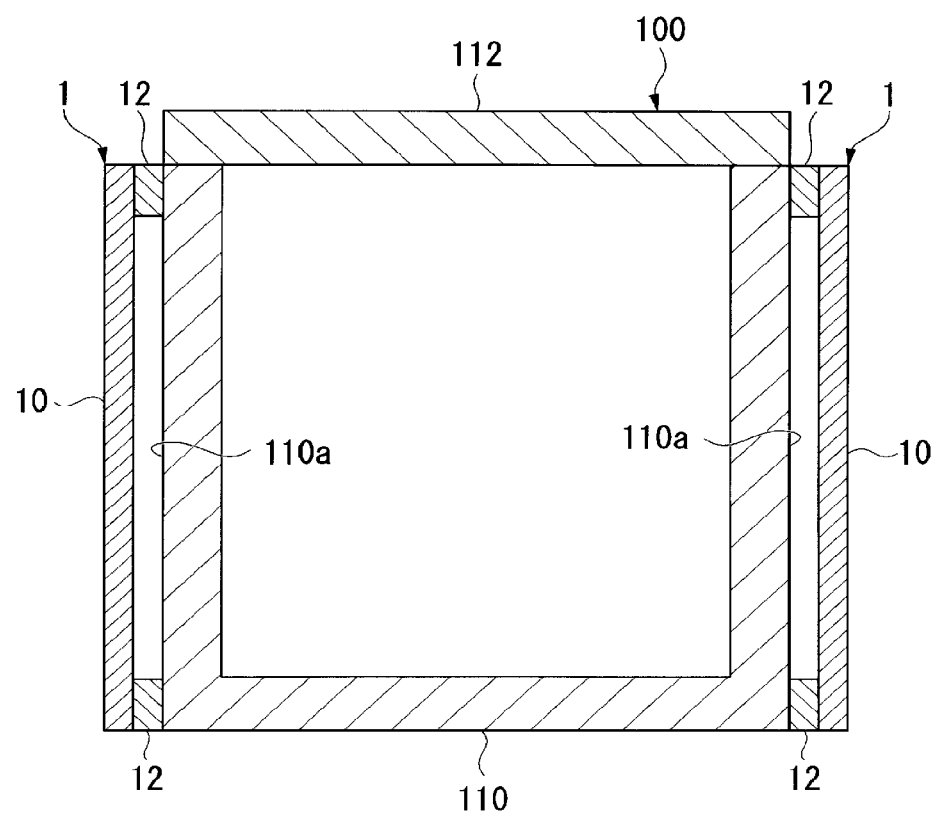
FIG. 4 is a cross-sectional view illustrating a state where the insulating member shown in FIG. 2 is attached to an object to be insulated.
Figure 5:
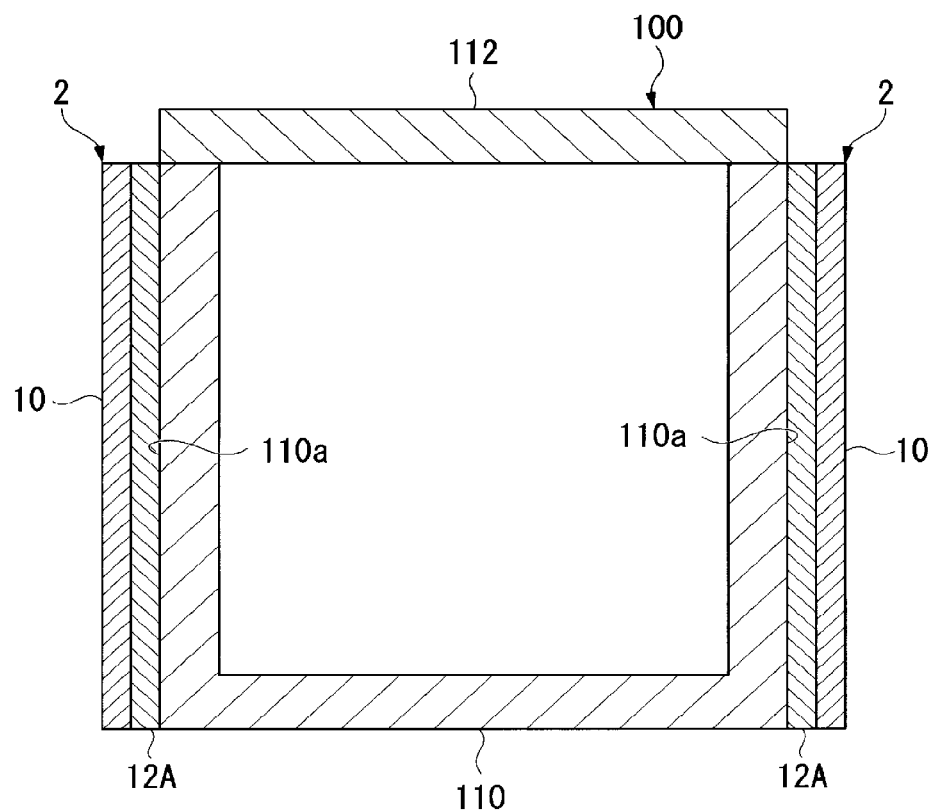
FIG. 5 is a cross-sectional view illustrating a state where the insulating member shown in FIG. 3 is attached to an object to be insulated.

Specifically, for example, as shown in FIG. 4, the insulating member 1 is attached to an object 100 to be insulated comprising a container main body 110 having an upper opening and a cover 112, and its side surfaces being application surfaces 110a, so that the elastic body 12 is on the application surface 110a side. Likewise, as shown in FIG. 5, the insulating member 2 is attached to an object 100 to be insulated so that the elastic body 12A is on the application surface 110a side.

Figure 8:
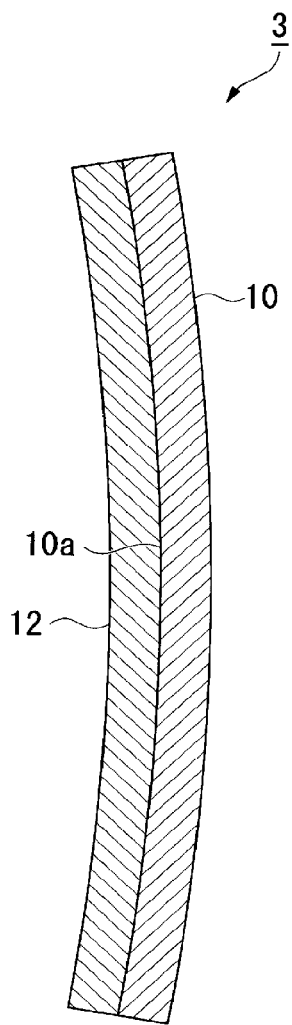
FIG. 8 is a cross-sectional view illustrating another example of the insulating member of the present invention.

The insulating member of the present invention may have a vacuum insulation panel having a curved application surface. For example, as shown in FIG. 8, it may be an insulating member 3 comprising a curved vacuum insulation panel 10, and an elastic body 12 provided along the entire periphery of an application surface 10a of the vacuum insulation panel 10.

Figure 9:
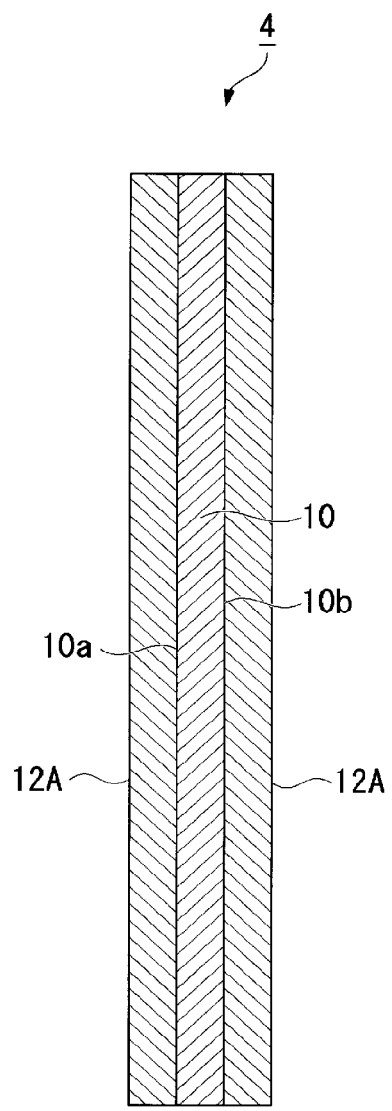
FIG. 9 is a cross-sectional view illustrating another example of the insulating member of the present invention.

The insulating member of the present invention may further have an elastic body on the surface opposite from the application surface of the vacuum insulation panel. For example, as shown in FIG. 9, an insulating member 4 may have an elastic body 12A provided both on an application surface 10a of a vacuum insulation panel 10 and on a surface 10b opposite from the application surface 10a.

(Vacuum Insulation Panel)

The vacuum insulation panel comprises a core material and a gas barrier film covering the core material, the core material being decompressed and encapsulated in an outer sheath formed of the gas barrier film.

The shape of the vacuum insulation panel is not particularly limited and is properly determined depending upon the shape of an application surface of an object to be insulated. Usually, the vacuum insulation panel is in a board-like shape, and may be flat or curved relative to the application surface.

<Core Material>

As the core material, a known core material employed for a vacuum insulation panel may be used. For example, it may be a board formed from an insulating material containing powder, glass wool or aerogel blanket, however, it is not limited thereto. In the case of a core material containing powder, the insulating material preferably contains fibers in addition to the powder, whereby a core material having a high strength tends to be obtained.

<<Powder>>

Now, the core material containing powder will be described as an example.

The powder may be known powder commonly employed for a core material. Specifically, fumed silica, porous silica and a radiation suppressing material are mentioned. From the viewpoint of easily obtaining a core material having a sufficient strength, it is preferred that the powder contain fumed silica.

As the powder, only one type of powder may be used or two or more types of powder may be used in combination.

Because the fumed silica is extremely fine powder, its specific surface area is normally employed as the index representing the size of the particles.

The fumed silica has a specific surface area of preferably from 50 to 400 $m^2/g$, more preferably from 100 to 350 $m^2/g$ and particularly preferably from 200 to 300 $m^2/g$. When the specific surface area of the fumed silica is at least the lower limit of the above range, it is easy to obtain an excellent insulating performance. When the specific surface area of the fumed silica is at most the upper limit of the above range, it is easy to apply a binder to the surfaces of the particles.

The specific surface area may be measured by a nitrogen adsorption method (BET method).

Specific examples of the fumed silica include products commercially available under the trademarks of AEROSIL 200 (specific surface area: 200 $m^2/g$, manufactured by NIPPON AEROSIL CO., LTD.), AEROSIL 300 (specific surface area: 300 $m^2/g$, manufactured by NIPPON AEROSIL CO., LTD.), CAB-O-SIL M-5 (specific surface area: 200 $m^2/g$, manufactured by Cabot Corporation, Japan), CAB-O-SIL H-300 (specific surface area: 300 $m^2/g$, manufactured by Cabot Corporation, Japan), and REOLOSILQS30 (specific surface area: 300 $m^2/g$, manufactured by Tokuyama Corporation).

As the fumed silica, only one type of fumed silica may be used, or two or more types of fumed silica may be used in combination.

In a case where porous silica is used, the porous silica has a specific surface area of preferably from 100 to 800 $m^2/g$, more preferably from 200 to 750 $m^2/g$, particularly preferably from 300 to 700 $m^2/g$. When the specific surface area of the porous silica is at least the lower limit of the above range, it is easy to obtain an excellent insulating performance. When the specific surface area of the porous silica is at most the upper limit of the above range, it is possible to reduce the amount of a binder absorbed in the porous silica when the binder is added to the porous silica. For this reason, the core material can be formed under a lower pressure even when the added amount of the binder is small. Thus, the core material can have a reduced density, and an excellent insulating performance will easily be obtained.

The porous silica has a porosity of preferably from 60 to 90%, more preferably from 65 to 85%, particularly preferably from 70 to 80%. When the porosity of the porous silica is at least the lower limit of the above range, it is easy to obtain an excellent insulating performance because it is possible to reduce the thermal conductivity in solid. When the porosity of the porous silica is at most the upper limit of the above range, it is easy to obtain an excellent insulating performance because porous silica particles are hardly to be crushed during molding with the result that the porous silica particles can maintain porosity.

The porosity may be measured by a nitrogen adsorption method (BJH method).

The porous silica has an average particle size of preferably from 1 to 300 μm, more preferably from 2 to 150 μm, particularly preferably from 3 to 100 μm when the average particle size is measured in volume base by, e.g. a laser diffraction scattering method or a coulter counter method. When the average particle size of the porous silica is at least the lower limit of the above range, it is easy not only to provide the porous silica with a high porosity but also to obtain an excellent insulating performance. When the average particle size of the porous silica is at most the upper limit of the above range, it is easy to obtain an excellent insulating performance because the core material can be prevented from having an excessively high density.

Specific examples of the porous silica include products commercially available under the trademarks of M.S. GEL and SUNSPHERE (both being manufactured by AGC Si-Tech. Co. Ltd.).

Examples of the radiation suppressing material include metal particles (such as aluminum particles, silver particles, and gold particles) and inorganic particles (such as graphite particles, carbon black particles, silicon carbide particles, titanium oxide particles, tin oxide particles, iron oxide particles and potassium titanate particles).

<<Binder>>

The insulating material may contain a binder, whereby the core material tends to have a sufficient strength even at a low density, and the shape of the core material is thereby maintained. For example, the powder may be particles made of fumed silica, which has a binder preliminarily applied to the surfaces of particles made of the fumed silica. The provision of the binder applied to the surfaces of the particles made of the fumed silica allows the particles made of fumed silica with a binder to be bonded together or the particles made of fumed silica with a binder to be bonded to particles made of another material (such as particles made of porous silica and fibers) even when molding is carried out under a low pressure.

It should be noted that even if a binder is applied to particles made of porous silica, it is difficult to enjoy the advantage offered by the binder because the binder is absorbed into the particles made of porous silica.

The binder may be an organic binder or an inorganic binder. Among them, the binder is preferably an inorganic binder from the viewpoint that such an inorganic binder has a low thermal conductivity and is capable of easily obtaining an excellent insulating performance.

Examples of the inorganic binder include a binder made of sodium silicate, a binder made of aluminum phosphate, a binder made of magnesium sulfate and a binder made of magnesium chloride. Among them, sodium silicate is particularly preferred from the viewpoint that it is capable of easily obtaining an excellent insulating performance.

The binder is preferably used as a binder liquid, more preferably as an aqueous solution, as dissolved in a solvent.

<<Fibers>>

When the insulating material contains fibers, it is easily possible to provide the core material with a high strength.

The fibers may be fibers commonly employed in vacuum insulation panels. Examples of the fibers include resin fibers and inorganic fibers. Among them, inorganic fibers are preferred from the viewpoints of minimizing the amount of outgas under vacuum, reducing a decrease in the insulating performance due to a drop in the degree of vacuum, and of obtaining an excellent heat resistance.

Examples of the inorganic fibers include alumina fibers, mullite fibers, silica fibers, glass wool fibers, glass fibers, rock wool fibers, slag wool fibers, silicon carbide fibers, carbon fibers, silica alumina fibers, silica alumina magnesia fibers, silica alumina zirconia fibers and silica magnesia calcia fibers.

The employed fibers have a fiber length D30 of preferably at least 100 μm, more preferably at least 200 μm. When the fiber length D30 is at least the lower limit of the above range, it is easy to suppress the occurrence of a crack in the core material.

The employed fibers have a fiber length D90 of preferably at most 20 mm, more preferably at most 10 mm. When the fiber length D90 is at most the upper limit of the above range, it is easy to enjoy the advantage offered by the fibers because the fibers are prevented from being excessively entangled such that the fibers are likely to be uniformly mixed with the powder particles.

The fibers have a thickness (diameter) of at most 15 μm from the viewpoint of being capable of reducing an increase in the heat transfer in solid by the fibers. The fibers have a thickness (diameter) of preferably at least 1 μm from the viewpoint of being easy to suppress the occurrence of a crack in the core material. In this specification, the term "fiber length D30" means a fiber length that represents 30% in a cumulative frequency distribution curve wherein the total number in a fiber length distribution sought based on the number is 100%. The term "fiber length D90" means a fiber length that represents 90% in a cumulative frequency distribution curve wherein the total number in a fiber length distribution sought based on the number is 100%. The fiber length distribution may be sought by a frequency distribution and a cumulative frequency distribution curve obtained by randomly measuring the lengths of at least 50 fibers in a photo observed by an optical microscope.

<<Proportion of Powder, Binder and Fibers>>

The proportion of the fumed silica in the powder (100 mass %) is preferably from 50 to 100 mass %, more preferably from 70 to 100 mass %, particularly preferably from 80 to 100 mass %. When the proportion of the fumed silica is at least the lower limit of the above range, it is easy to provide the core material with a high strength.

The proportion of the porous silica in the powder (100 mass %) is preferably from 0 to 50 mass %, more preferably from 0 to 30 mass %, particularly preferably from 0 to 20 mass %. As the proportion of the porous silica increases, it is easier to provide the vacuum insulation panel with an excellent insulating performance. When the proportion of the porous silica is at most the upper limit of the above range, it is easy to provide the core material with a high strength.

When the powder contains a mixture of the porous silica and the fumed silica with a binder preliminarily applied to the surfaces of particles thereof, the mass ratio MA/MB of the mass MA of the fumed silica with a binder having not yet been applied to the surfaces of particles thereof to the mass MB of the porous silica is preferably at least 50/50, more preferably at least 70/30, particularly preferably at least 80/20. When the mass ratio MA/MB is at least the lower limit of the above range, it is easy to provide the core material with a much lower density, an excellent insulating performance and a sufficient strength.

When the powder contains the radiation suppressing material, the proportion of the radiation suppressing material in the powder (100 mass %) is preferably from 3 to 30 mass %, more preferably from 5 to 25 mass %, particularly preferably from 10 to 20 mass %. When the proportion of the radiation suppressing material is at least the lower limit of the above range, it is easy to enjoy the advantage offered by the radiation suppressing material. When the proportion of the radiation suppressing material is at most the upper limit of the above range, it is easy to enjoy an excellent insulating performance since it is possible to suppress an increase in the heat transfer in solid by the radiation suppressing material.

When fumed silica with a binder preliminarily applied to the surfaces of particles thereof is employed, the proportion of the binder is preferably from 0.1 to 15 parts by mass, more preferably from 0.5 to 10 parts by mass, particularly preferably from 1 to 4 parts by mass per 100 parts by mass of the fumed silica with a binder having not yet been applied to the surfaces of particles thereof. When the proportion of the binder is at least the lower limit of the above range, it is easy to obtain a core material having a much lower density and a sufficient strength, and to obtain an excellent insulating performance. When the proportion of the binder is at most the upper limit of the above range, it is easy to suppress a decrease in the insulating performance because it is possible to suppress an increase in the heat transfer in solid by the binder. So long as the shape of the core material can be maintained, the proportion of the binder is preferably lower so as to obtain a better insulating performance, and the binder may not be added.

When no fumed silica with a binder preliminarily applied to the surfaces of particles thereof is employed as in, e.g. a case where fumed silica, a binder and a component other than them (such as porous silica and fibers) are simultaneously mixed together, the proportion of the binder is preferably from 0.1 to 15 parts by mass, more preferably from 0.5 to 10 parts by mass, particularly preferably from 1 to 4 parts by mass per 100 parts by mass of the powder. When the proportion of the binder is at least the lower limit of the above range, it is easy to provide the core material with a much lower density and a sufficient strength, and to obtain an excellent insulating performance. When the proportion of the binder is at most the upper limit of the above range, it is easy to suppress a decrease in the insulating performance because it is possible to suppress an increase in the heat transfer in solid by the binder.

In a case where the powder is used for the core material, the preferred composition of the powder by mass ratio is fumed silica:porous silica:radiation suppressing material of 70 to 90:0 to 20:10 to 20 (total as 100).

The proportion of the fibers is preferably from 1 to 30 parts by mass, more preferably from 2 to 20 parts by mass, particularly preferably from 4 to 10 parts by mass per 100 parts by mass of the powder. When the proportion of the fibers is at least the lower limit of the above range, it is easy to provide the core material with a high strength. When the proportion of the fibers is at most the upper limit of the above range, it is easy to suppress a decrease in the insulating performance because it is possible to suppress an increase in the heat transfer in solid by the fibers.

<Gas Barrier Film>

As the gas barrier film, any known gas barrier film employed in vacuum insulation panels may be employed without limitation.

There are no particular limitations to the size and the shape of an outer sheath formed of the gas barrier film, which may be properly determined to comply with the size and the shape of a desired core material.

<Degree of Vacuum>

The degree of vacuum in the outer sheath in the vacuum insulation panel is preferably at most $1 \times 10^3$ Pa, more preferably at most $1 \times 10^2$ Pa from the viewpoint of obtaining an excellent insulating performance and providing the vacuum insulation panel with a longer service life.

<Process for Producing Vacuum Insulation Panel>

The process for producing the vacuum insulation panel is not particularly limited and may, for example, be a process comprising a forming step of forming an insulating material to obtain a core material, and a decompressing and encapsulating step of decompressing and encapsulating the core material in an outer sheath formed of a gas barrier film to obtain the vacuum insulation panel.

As the method of forming the insulating material to obtain a core material, a known method may be employed, and for example, a method of pouring the insulating material into a mold and pressure-molding it may be mentioned.

In the decompressing and encapsulating step, for example, the core material is contained in an outer sheath formed of a gas barrier film, having an opening, the opening of the outer sheath is sealed under a depressurized condition e.g. by heat-sealing, and the outside of the outer sheath is returned to atmospheric conditions to obtain the vacuum insulation panel.

Figure 7:
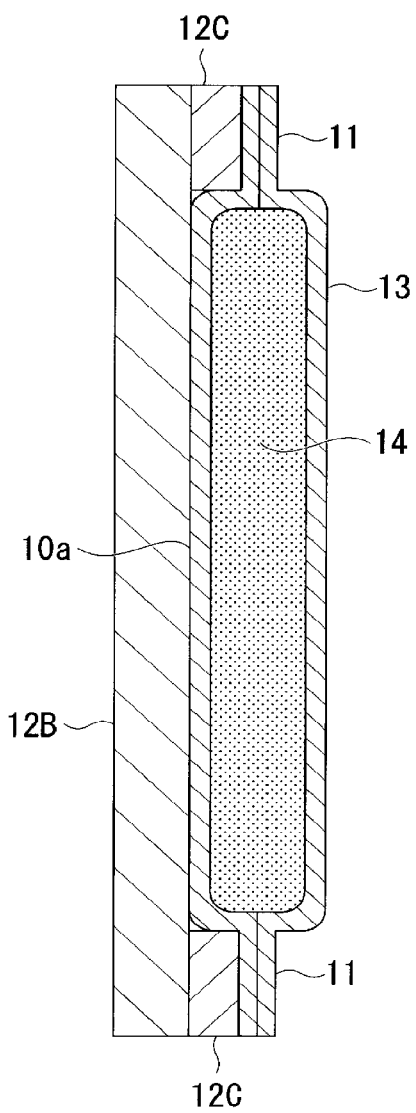
FIG. 7 is a cross-sectional view illustrating another example of the insulating member of the present invention.

In the vacuum insulation panel, the sealed portion (edge) formed e.g. by heat-sealing along the periphery of the core material may or may not be folded. In a case where the edge is not folded, heat is likely to be emitted since there is a difference in level between the core material portion and the edge of the vacuum insulation panel, and the edge is not closely in contact with the object to be insulated. Specifically, as shown in FIG. 7, in the vacuum insulation panel 10 comprising a core material 14 contained in an outer sheath 13, the periphery of the outer sheath 13 being heat-sealed and a sealing part 11 being formed, there is a difference in level between the sealing part 11 and an application surface 10a at a portion where the core material 14 is contained in the vacuum insulation panel 10. In such a case, for example, it is preferred to attach an elastic body 12C having the same thickness as the difference in level to the side of the object to be insulated of the sealing part 11, to eliminate the difference in level between the application surface 10a and the sealing part 11 of the vacuum insulation panel 10, and to provide an elastic body 12B so as to cover the application surface 10a and the elastic body 12C on the sealing part 11. Thus, a gap is less likely to form between an application surface of the object to be insulated and the sealing part, and entering and exiting of the air and thus the heat between the application surface and the vacuum insulation panel tend to be suppressed.

(Elastic Body)

The elastic body in the insulating member of the present invention has a degree of elongation of at least 10%, an Asker F hardness of at least 10 and an Asker C hardness of at most 30.

The elastic body has a degree of elongation of at least 10%, preferably from 15 to 1,000%, more preferably from 18 to 800%. When the degree of elongation of the elastic body is at least the lower limit, entering and exiting of the air and thus the heat between the application surface of the object to be insulated and the vacuum insulation panel tend to be suppressed. When the degree of elongation of the elastic body is at most the upper limit of the above range, it is possible to prevent the elastic body from being excessively deformed and to prevent thermal insulation from being insufficient.

The degree of elongation is a value measured in accordance with JIS K6400 (2012).

The elastic body has an Asker F hardness of at least 10, preferably at least 12, more preferably at least 15. When the Asker F hardness of the elastic body is at least the lower limit, it is possible to prevent the elastic body from being excessively deformed and to prevent thermal insulation from being insufficient.

The elastic body has an Asker C hardness of at most 30, preferably at most 25, more preferably at most 20. When the Asker C hardness of the elastic body is at most the upper limit, entering and exiting of the air and thus the heat between the application surface of the object to be insulated and the vacuum insulation panel tends to be suppressed.

The elastic body has a thickness of at least 1 mm, more preferably at least 1 mm and at most 50 mm, further preferably at least 2 mm and at most 40 mm, particularly preferably at least 3 mm and at most 30 mm. When the thickness of the elastic body is at least the lower limit of the above range, an effect by the elastic body tends to be obtained. When the thickness of the elastic body is at most the upper limit of the above range, an insulating performance of the vacuum insulation panel tends to be effectively exhibited.

In a case where the elastic body is provided only along the periphery on one surface of the vacuum insulation panel as in the case of the insulating member 1, the elastic body has a width of preferably at least 3 mm, more preferably at least 5 mm. When the width of the elastic body is at least the lower limit of the above range, an excellent insulating performance tends to be obtained.

The shape of the elastic body is not particularly limited, and is properly determined depending upon the shape of the application surface of the object to be insulated.

The elastic body may be an inorganic elastic body or an organic elastic body.

The material of the organic elastic body is preferably a synthetic resin, a natural rubber or a synthetic rubber.

The synthetic resin may, for example, be a polyurethane resin, a polyolefin resin, a melamine resin, a polyimide resin, a polyamide resin or a fluororesin.

The synthetic rubber may, for example, be an ethylene/propylene/diene rubber (EPDM), a silicon rubber or a fluorinated rubber.

Further, the material of the elastic body is preferably selected depending upon the ambient temperature at which the object to be insulated and the vacuum insulation panel are used. For example, in the case of a high temperature object to be insulated, the material is preferably a melamine resin, a polyimide resin, a polyamide resin, a fluororesin, an EPDM, a silicon rubber or a fluorine rubber. Further, in the case of a low temperature object to be insulated, the material may optionally be selected from a synthetic resin and a synthetic rubber.

As the elastic body, only one elastic body may be used alone or two or more elastic bodies may be used in combination.

In a case where two or more elastic bodies are used in combination, the two or more elastic bodies are laminated, and in a case where the temperature of the object to be insulated is high, the laminate is provided to the vacuum insulation panel so that the elastic body with a higher heat resistance is disposed on the side of the object to be insulated, whereby deterioration of the elastic body can be suppressed.

The elastic body may be an elastic foam. An elastic foam is likely to deform when provided to the application surface of an object to be insulated and thus a gap is less likely to occur, whereby entering and exiting of the air and thus the heat between the application surface and the vacuum insulation panel tends to be suppressed.

As the elastic foam, only one type may be used alone or two or more types may be used in combination.

The elastic foam is preferably at least one member selected from the group consisting of a flexible polyurethane foam, a polyethylene foam, a polypropylene foam, a melamine foam, a polyimide foam, a natural rubber foam and a synthetic rubber foam.

Further, the material of the elastic foam is preferably selected depending upon the ambient temperature at which the object to be insulated and the vacuum insulation panel are used. For example, in the case of a high temperature object to be insulated, the elastic foam is preferably a melamine foam, a polyethylene foam, a polypropylene foam, a natural rubber foam or a synthetic rubber foam. Further, in the case of a low temperature object to be insulated, the elastic foam may optionally be selected from a synthetic resin foam and a synthetic rubber foam.

Further, the elastic foam preferably has at least one of a sound absorbing property and a water absorbing property.

The elastic foam may have open cells or may have closed cells.

When the elastic foam have open cells, entering and exiting of the heat tends to be suppressed, and since such an elastic foam has favorable sound absorbing property and/or water absorbing property, it is possible to prevent the sound and/or water from being entering and exiting. The elastic foam having open cells is not particularly limited so long as it has open cells, however, a flexible polyurethane foam is preferred since it is likely to have open cells and has favorable sound absorbing property and/or water absorbing property.

A vacuum insulation panel which suppress entering and exiting of the heat and which has a sound absorbing property, is capable of thermal insulation and can reduce sounds generated from the object to be insulated, and thus it is suitably used for an object to be insulated which makes sounds. Further, when a vacuum insulation panel which can suppress entering and exiting of the heat and which has a sound absorbing property is used as an insulation panel on a wall or a ceiling of a living space, it is possible not only to achieve thermal insulation but also to reduce sounds from the outside.

Further, in a case where the object to be insulated has a low temperature, water may be attached to the object by due condensation. A vacuum insulation panel which can suppress entering and exiting of the heat and which has a water absorbing property not only is capable of thermal insulation but also absorbs water generated by due condensation, and thus such a vacuum insulation panel can be suitably used for thermal insulation of an object on which due condensation occurs.

The elastic foam has a density of from 3 to 500 kg/m$^3$, more preferably from 5 to 400 kg/m$^3$. When the density of the elastic body is at least the lower limit, it is possible to prevent the elastic body from being excessively deformed and to prevent thermal insulation from being insufficient. When the density of the elastic body is at most the upper limit of the above range, an excellent insulating performance tends to be obtained.

The elastic foam preferably has heat resistance. The term "heat resistance" means that the insulation panel can be continuously used at a temperature at which the insulation panel is commonly employed. Further, the temperature at which the insulation panel is continuously used will be referred to as a heat resistant temperature.

The mode how the elastic body is provided to one surface of the vacuum insulation panel is not particularly limited, and a mode of bonding the elastic body to one surface of the vacuum insulation panel by a double-coated pressure-sensitive adhesive tape, a mode of bonding the elastic body by means of an adhesive, etc., may be mentioned.

(Application)

The application of the insulating member of the present invention is not particularly limited, and for example, a house, a vehicle, an insulating container, a refrigerator or a water heater may be mentioned.

The insulating member of the present invention can maintain its excellent insulating performance for a long period of time, and accordingly, it is preferably used for thermal and cold insulation.

For example, the water heater provided with the insulating member of the present invention may, for example, be a water heater comprising a boiler and the insulating member of the present invention attached to the outside surface of the boiler. By the insulating member of the present invention, a high insulating effect will stably be exhibited.

Further, when the insulating member of the present invention is used for a water heater, it is preferred to use an elastic foam having a heat resistant temperature of at least 100° C. to obtain stable thermal insulation property over a long period of time, depending on the temperature of the water used.

(Function and Advantage)

As described above, a sufficient insulating effect may not be obtained by a conventional method of bonding a vacuum insulation panel to the application surface of an object to be insulated. According to studies on this problem by the present inventors, it was found that a gap is formed between the vacuum insulation panel and the application surface, and by the air flowing through the gap, the heat of the object to be insulated uses to the environment. Particularly in a case where the surface of the vacuum insulation panel has irregularities such as wrinkles, a case where the edge of the vacuum insulation panel is folded, etc., it is considered that the sufficient insulating effect is hardly obtained since a gap tends to form between the vacuum insulation panel and the application surface. Further, also in a case where a double-coated pressure-sensitive adhesive tape used to bond the vacuum insulation panel is thick, such a tape cannot sufficiently follow the application surface, and a gap is likely to form between the vacuum insulation panel and the application surface.

Whereas, in the insulating member of the present invention, an elastic body which is likely to deform as compared with the vacuum insulation panel is provided to at least the periphery of one surface of the vacuum insulation panel. Thus, when the insulating member of the present invention is attached to an object to be insulated so that the elastic body is on the application surface side, the elastic body deforms to comply with the shapes of the vacuum insulation panel and the application surface and can be closely attached thereto, and thus formation of a gap between at least the periphery of the vacuum insulation panel and the application surface can be suppressed. As a result, diffusion of the heat of the object to be insulated to the environment by the air flowing through between the object to be insulated and the vacuum insulation panel can be suppressed, whereby a high insulating effect will stably be obtained.

Further, since the material attached to the vacuum insulation panel is an elastic body, even if a space in which the vacuum insulation panel is attached to the application surface is limited, the elastic body can be applied by compressive deformation in a thickness direction without cutting the attached elastic body.

(Method for Attaching Insulating Member)

As a method for attaching the insulating member of the present invention to an object to be insulated, for example, an insulating member having an elastic body preliminarily provided to one surface of a vacuum insulation panel is prepared, and the insulating member is attached to an object to be insulated e.g. by a double-coated pressure-sensitive adhesive tape so that the elastic body is on the application surface side of the object to be insulated.

Otherwise, a vacuum insulation panel and an elastic body are separately prepared, and the vacuum insulation panel is bonded to an object to be insulated via the elastic body, whereby the insulating member is assembled on an application surface of the object to be insulated.

Specifically, for example, an elastic body such as a flexible urethane foam may be bonded to an application surface of an object to be insulated e.g. by a double-coated pressure-sensitive adhesive tape, and a vacuum insulation panel is bonded to the elastic body e.g. by a double-coated pressure-sensitive adhesive tape. Otherwise, a vacuum insulation panel may be disposed slightly distant from an application surface of an object to be insulated, and in such a state, a caulking material is filled in between the application surface and the periphery of the vacuum insulation panel to form an elastic body thereby to attach the vacuum insulation panel. Otherwise, a vacuum insulation panel may be disposed slightly distant from an application surface of an object to be insulated, and in such a state, an elastic foam consisting of a flexible urethane foam is formed by a spraying method between the application surface and the periphery of the vacuum insulation panel to attach the vacuum insulation panel.

EXAMPLES

Now, the present invention will be described in further detail with reference to Examples. However, it should be understood that the present invention is by no means restricted thereto. Ex. 1 to 4 and 8 are Examples of the present invention, and Ex. 5 to 7 and 9 are Comparative Examples.

[Asker F Hardness, Asker C Hardness]

The Asker F hardness of the elastic body was measured by an ASKER Durometer Type F in accordance with JIS K6253 at room temperature (22° C.). Further, with respect to a flexible polyurethane foam, measurement was conducted with the elastic body having a thickness of 38 mm, and a value was read 20 seconds after compression.

The Asker C hardness of the elastic body was measured in the same manner as the Asker F hardness except that an ASKER Durometer Type C was used.

[Degree of Elongation, Permeability and Density]

The degree of elongation, permeability and density were measured in accordance with JIS K6400 (2004 and 2012).

Production Example 1

40 parts by mass of fumed silica (product name: "AEROSIL 300", specific surface area: 300 m$^2$/g, manufactured by NIPPON AEROSIL CO., LTD., the same applies hereafter) and a binder liquid which was prepared by diluting 3.4 parts by mass (1.3 parts by mass in solid content conversion) of sodium silicate No. 3 (manufactured by AGC Si-Tech Co., Ltd.) with 22.9 parts by mass of deionized water, were blended by a blender. Then, 40 parts by mass of fumed silica and 20 parts by mass of M.S. GEL (manufactured by AGC Si-Tech Co., Ltd.) as porous silica were added and further, 2 parts by mass of silica-magnesia-calcia fibers (product same: "Superwool", D30: 227 μm, D90: 902 μm, manufactured by Shin-Nippon Thermal Ceramics. Corporation) as the inorganic fibers were added and blended by a blender to obtain an insulating material.

The obtained insulating material was poured into a mold and pressurized to mold the insulating material into a flat plate of 90 mm×100 mm×10 mm in thickness, which was heated at 200° C. for one hour to prepare a core material. Then, two commercially available gas barrier films (ADY-134, manufactured by ADY Co., Ltd.) were superposed so that the heat-seal layer faced inside, and three sides thereof were heat-sealed to prepare an outer sheath, in which the core material was accommodated, and the outer sheath with the core material accommodated therein was placed in a vacuum chamber with a heat-seal function. The inside of the vacuum chamber was depressurized to 30 Pa, and in such a state, the opening of the outer sheath was sealed by heat-sealing, and the outside of the outer sheath was returned to atmospheric conditions, to obtain a vacuum insulation panel of 90 mm×100 mm×10 mm in thickness.

Then, a flexible urethane foam of 90 mm×100 mm×5 mm in thickness as an elastic body A was bonded by a double-coated pressure-sensitive adhesive tape to the entire surface of one surface of the vacuum insulation panel to prepare an insulating member. The flexible urethane foam used had an Asker F harness of 25 (thickness: 38 mm), a degree of elongation of 280%, and a heat resistant temperature of 70° C. As the other physical properties, the flexible urethane foam used had a permeability of 24 L/min, and a density of 59.8 kg/m$^3$.

Production Example 2

An insulating member was prepared in the same manner as in Production Example 1 except that as an elastic body B, instead of the flexible urethane foam, an ethylene/propylene/diene rubber (EPDM) sponge (product name: "Rubber Sponge E-4088", manufactured by INOAC CORPORATION) of the same shape was used. The rubber sponge used had an Asker C hardness of 6, a degree of elongation of 220% and a heat resistant temperature of 120° C.

Production Example 3

An insulating member was prepared in the same manner as in Production Example 1 except that as an elastic body C, instead of the flexible urethane foam, a melamine foam (product name: "Basotect G", manufactured by INOAC CORPORATION" of the same shape was used. The melamine foam used had an Asker F hardness of 60, a degree of elongation of 18% and a heat resistant temperature of 150° C.

Production Example 4

An insulating member was prepared in the same manner as in Production Example 1 except that the same flexible urethane foam used in Production Example 1 was bonded on four sides of one surface of the vacuum insulation panel along the periphery with a width of 20 mm and a thickness of 5 mm.

Ex. 1

A stainless steel container having an upper opening with a size of about 140 mm×140 mm, and having a depth of 100 mm, was prepared.

A vacuum insulation panel of 140 mm×140 mm×10 mm in thickness prepared in the same manner as in Production Example 1 was bonded to the bottom of the stainless steel container by means of a double-coated pressure-sensitive adhesive tape. Then, four insulating members obtained in Production Example 1 were bonded to the four side surfaces of the stainless steel container by a double-coated pressure-sensitive adhesive tape so that the elastic body faced the stainless steel container side. To a portion to which the vacuum insulation panel or the insulating member was not bonded, on the outer side of the stainless steel container, the flexible urethane foam having a thickness of 5 mm used in Production Example 1 was bonded.

The stainless steel container was filled with water and heated by an immersion heater to adjust the water temperature to be 90° C., and then the immersion heater was taken out, and the upper opening of the stainless steel container was covered with a foamed styrol plate (Styrofoam EX) having a thickness of 25 mm. While the stainless steel container was left to stand at room temperature (22° C.), the change of the water temperature was measured by a thermocouple to measure the time in which the water temperature dropped to 50° C. was measured.

Ex. 2

In the same manner as in Ex. 1 except that the insulating member in Production Example 2 was used instead of the insulating member in Production Example 1, the change of the water temperature was measured, and the time in which the water temperature dropped to 50° C. was measured.

Ex. 3

In the same manner as in Ex. 1 except that the insulating member in Production Example 3 was used instead of the insulating member in Production Example 1, the change of the water temperature was measured, and the time in which the water temperature dropped to 50° C. was measured.

Ex. 4

In the same manner as in Ex. 1 except that the insulating member in Production Example 4 was used instead of the insulating member in Production Example 1, the change of the water temperature was measured, and the time in which the water temperature dropped to 50° C. was measured.

Ex. 5

In the same manner as in Ex. 1 except that to the four side surfaces of the stainless steel container, the vacuum insulation panel in Production Example 1 was bonded instead of the insulating member obtained in Production Example 1, the change of the water temperature was measured, the time in which the water temperature dropped to 50° C. was measured.

Ex. 6

In the same manner as in Ex. 1 except that among the vacuum insulation panel on the bottom of the stainless steel container, and the insulating members and the flexible urethane foam on the side surfaces, only the insulating members were not bonded, the change of the water temperature was measured, and the time in which the water temperature dropped to 50° C., was measured.

Ex. 7

In the same manner as in Ex. 1, the vacuum insulation panel was attached to the bottom of the stainless steel container. Then, to the four side surfaces of the stainless steel container, the same flexible urethane foam as in Production Example 1 having a thickness of 5 mm was bonded by a double-coated pressure-sensitive adhesive tape so that the center portion in the width direction on each side surface was exposed in a strip shape with a width of 60 mm in the vertical direction. Then, the vacuum insulation panel in Production Example 1 was bonded to the flexible urethane foam on each of the four side surfaces of the stainless steel container by a double-coated pressure-sensitive adhesive tape, to form a gap of 5 mm between the center portion in the width direction on each of the side surfaces of the stainless steel container and the vacuum insulation panel.

Then, in the same manner as in Ex. 1, the stainless steel container was filled with water and heated, the change of the water temperature was measured by a thermocouple, and the time in which the water temperature dropped from 90° C. to 50° C. was measured.

Figure 6:
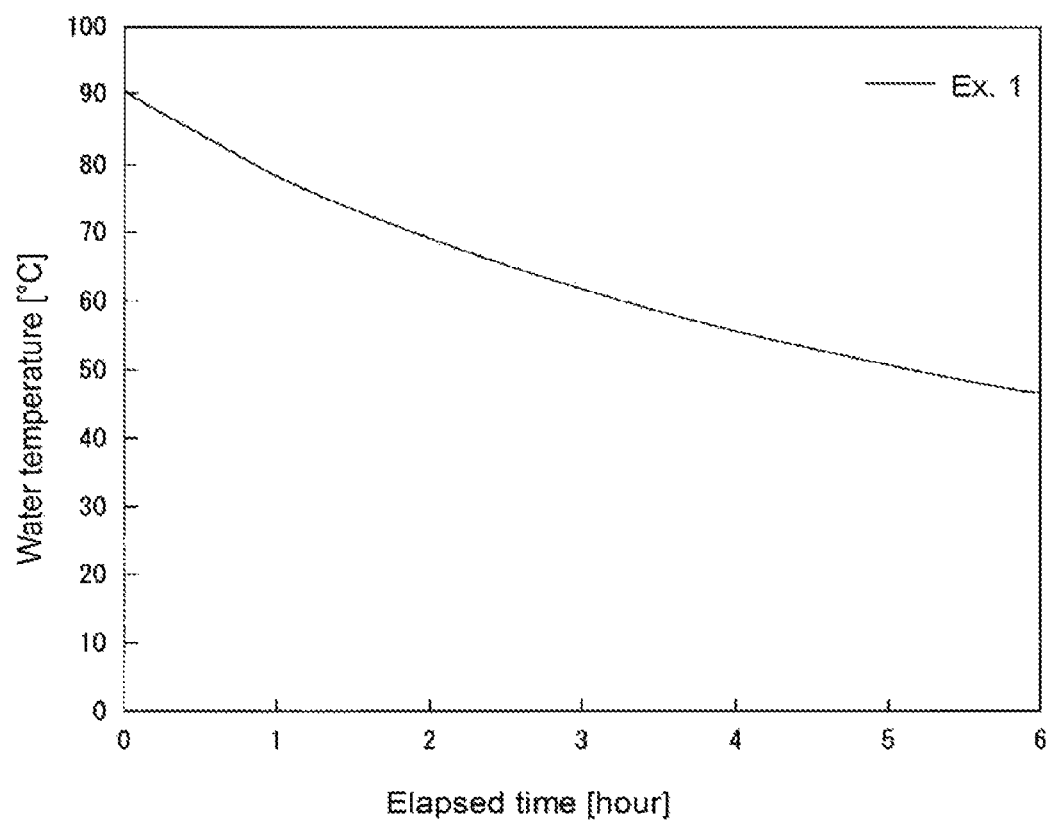
FIG. 6 is a graph illustrating a change of the water temperature relative to the elapsed time in Ex. 1.

A graph illustrating the change of the water temperature relative to the elapsed time in Ex. 1 is shown in FIG. 6.

Further, physical properties of the elastic body in the elastic member in each Ex. and the time in which the water temperature dropped to 50° C. are shown in Table 1.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Insulating member |  | Production Ex. 1 | Production Ex. 2 | Production Ex. 3 | Production Ex. 4 | — | — | — |
| Type |  | Vacuum insulation panel + elastic body A | Vacuum insulation panel + elastic body B | Vacuum insulation panel + elastic body C | Vacuum insulation panel + elastic body A | Vacuum insulation panel | — | Vacuum insulation panel + elastic body A |
| Thickness of vacuum insulation panel | mm | 10 | 10 | 10 | 10 | 10 | — | 10 |
| Elastic body | Thickness of elastic body | mm | 5 | 5 | 10 | 5 | — | — | 5 |
|  | Degree of elongation | [%] | 280 | 220 | 18 | 280 | — | — | 280 |
|  | Asker F hardness |  | — | 25 | — | 60 | 36 | — | 36 |
|  | Asker C hardness |  | — | — | 6 | — | — | — | — |
|  | Density | [kd/m$^3$] | 59.8 | 110 | 10.3 | 59.8 | — | — | 59.8 |
|  | Tensile strength | [kPa] | 101 | 490 | 148 | 101 | — | — | 101 |
| Time in which water temperature dropped from 90° C. to 50° C. |  | 5 hours 54 min | 6 hours 30 min | 6 hours 35 min | 5 hours 10 min | 4 hours 55 min | 2 hours 56 min | 4 hours 15 min |

As shown in Table 1, in Ex. 1 to 4 in which the insulating member of the present invention was used, the time in which the water temperature dropped to 50° C. was long, and an excellent heat insulating performance was obtained as compared with Ex. 5 to 7 in which the insulating member of the present invention was not used.

Ex. 8

In the same manner as in Production Example 1, a vacuum insulation panel of 500 mm×500 mm×10 mm in thickness was obtained. Then, the same flexible polyurethane foam as in Ex. 1 of 500 mm×500 mm×5 mm in thickness as an elastic body A was bonded to the entire surface of both surfaces of the vacuum insulation panel by a double-coated pressure-sensitive adhesive tape to prepare an insulating member.

Of the obtained insulating member, the sound absorption coefficient at a frequency of from 400 Hz to 5,000 Hz was measured by a reverberation room method in accordance with ISO140-3.

Ex. 9

Of the vacuum insulation panel used in Ex. 8, the sound absorption coefficient was measured in the same manner as in Ex. 8.

Figure 10:
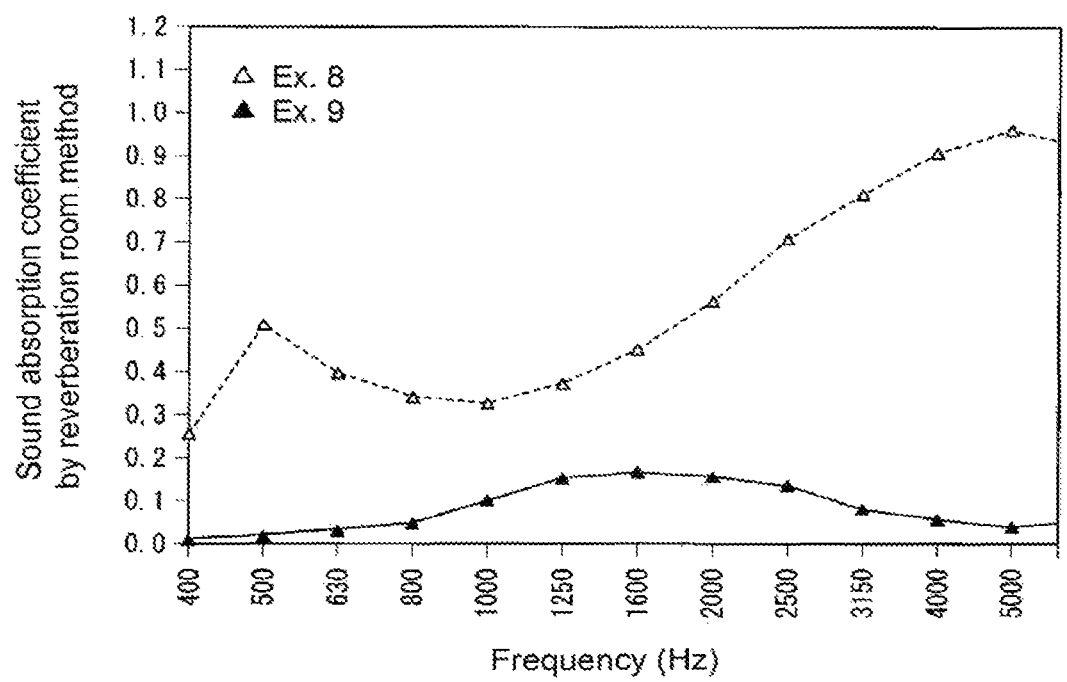
FIG. 10 is a sound-absorbing graph in Ex. 8 and 9.

The results of measurement in Ex. 8 and 9 are shown in FIG. 10. As shown in FIG. 10, by attaching a flexible urethane foam to a vacuum insulation panel, not only an excellent insulating performance is obtained but also a sound absorbing property can be imparted.

INDUSTRIAL APPLICABILITY

The insulating member of the present invention is applicable to items required for heat preservation, cold insulation or thermal insulation, where energy saving is sought. Specifically, it is applicable to, e.g. walls, roofs, floors and pipes of houses and buildings, the field of household equipment, such as solar light/heat equipment; the field of heat preservation and cold insulation, such as a thermostatic tank, a water heater, a hot water tank, a rice cooker, a refrigerator, a freezer, cold preserving box, a cold preserving tank, a vending machine, a cooler box, a cold preserving cover and cold weather clothing: the field of industrial equipment, e.g. electrical and electronic equipment, such as a laptop computer, a liquid crystal projector, a copying machine, a battery and a fuel cell, and a semiconductor manufacturing system; the field of a mobile body, such as an automobile, a bus, a truck, a cold preserving vehicle, a train, a freight train and a ship; and plant piping.

The entire disclosure of Japanese Patent Application No. 2014-262121 filed on Dec. 25, 2014 including specification, claims, drawings and summary are incorporated herein by reference in its entirety.

What is claimed is:

1. An insulating member comprising a vacuum insulation panel in a board-like shape and an elastic body,
   the elastic body is bonded on at least the periphery of an application surface of the vacuum insulation panel by an adhesive,
   wherein the vacuum insulation panel has a core material and a gas barrier film covering the core material, and the core material is decompressed and encapsulated in an outer sheath formed of the gas barrier film, and
   the elastic body is an elastic foam having a density of from 3 to 500 kg/m$^3$ which has a degree of elongation of at least 10%, an Asker F hardness of at least 10 and an Asker C hardness of at most 30, and the application surface of the vacuum insulation panel is applied to a surface of an object to be insulated such that when applied to the object to be insulated, the elastic body is between the vacuum insulation panel and the surface of the object to be insulated, and
   wherein an outer edge of the vacuum insulation panel and an outer edge of the elastic body coincide.

2. The insulating member according to claim 1, wherein the elastic body has a thickness of at least 1 mm.

3. The insulating member according to claim 1, wherein the elastic body is made of a synthetic resin, a natural rubber or a synthetic rubber.

4. The insulating member according to claim 1, wherein the elastic foam is at least one member selected from the group consisting of a flexible polyurethane foam, a polyethylene foam, a polypropylene foam, a melamine foam, a polyimide foam, a natural rubber foam and a synthetic rubber foam.

5. The insulating member according to claim 1, wherein the elastic has at least one of a sound absorbing property and a water absorbing property.

6. The insulating member according to claim 1, wherein the elastic foam has a heat resistant temperature of at least 100° C.

7. A method for attaching an insulating member, which comprises bonding the insulating member as defined in claim 1 to an object to be insulated.

8. A method for attaching an insulating member, which comprises assembling the insulating member as defined in claim 1 on an object to be insulated,
   wherein the vacuum insulation panel and the elastic body are separately prepared, and the vacuum insulating panel is bonded to the object to be insulated via the elastic body.

9. The insulating member according to claim 1, wherein the degree of elongation is from 15% to 1,000%.

10. The insulating member according to claim 1, wherein the adhesive bond comprises a double-coated adhesive tape.

11. An object insulated with the insulating member according to claim 1, wherein the object insulated is one selected from the group consisting of a house, a vehicle, a container, a refrigerator and a water heater.

\* \* \* \* \*